Aug. 6, 1929. J. M. WHITCOMB 1,723,101
VENTILATOR FOR CORNCRIBS AND THE LIKE
Filed Feb. 11, 1928
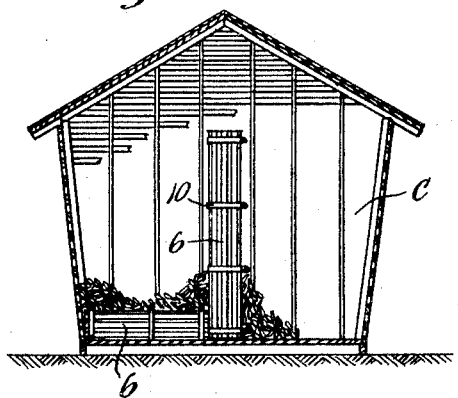
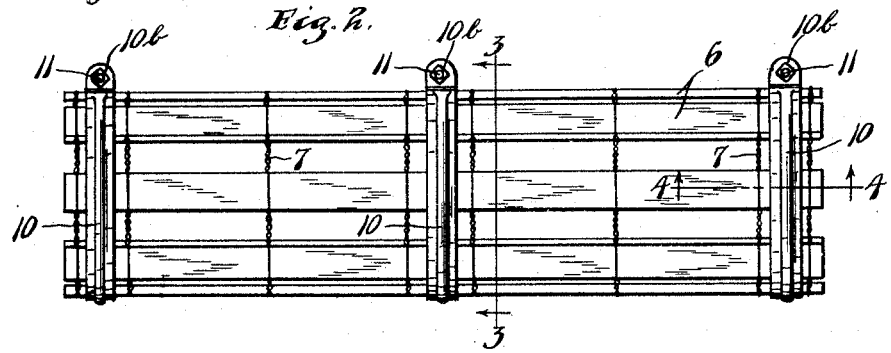
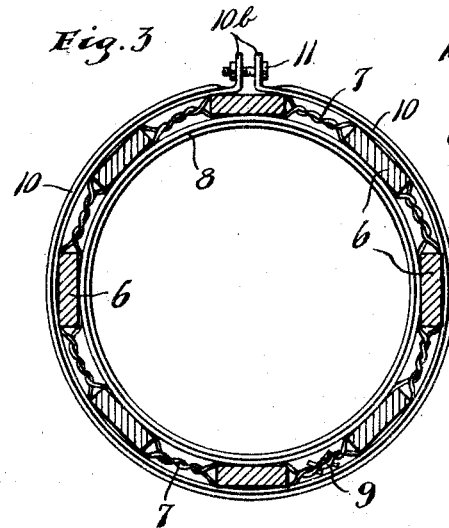
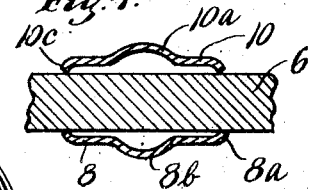
INVENTOR.
JOHN M. WHITCOMB,
BY HIS ATTORNEYS.

Patented Aug. 6, 1929.

1,723,101

UNITED STATES PATENT OFFICE.

JOHN M. WHITCOMB, OF REDWOOD FALLS, MINNESOTA.

VENTILATOR FOR CORNCRIBS AND THE LIKE.

Application filed February 11, 1928. Serial No. 253,582.

This invention relates to ventilating devices for corn cribs and other structures wherein corn or other products are stored or cured.

Oftentimes the corn occupying the central portion of the crib is spoiled or seriously damaged due to the fact that adequate circulation of air cannot be supplied thereto. Some corn cribs have been devised wherein ventilators are built into the crib to supply air circulation to the central contents thereof. Such devices have been expensive to the farmer, usually difficult to intall and in many cases unsuccessful to give the proper amount of aeration.

It is the main object of my invention to provide a simple but highly efficient ventilator which may be cheaply produced and loosely disposed within a crib or like structure to adequately ventilate the contents of said structure.

Another object is to provide a ventilating device for corn cribs and the like, wherein a supply of corn or other material within the crib will co-operate with my structure to afford an upstanding ventilation tube connected to produce a draft and deriving its source of air from without the crib, said tube moreover supplying air laterally throughout its length to the central portion of the contents within the crib.

A further object is to provide a device of the class described, comprising one or more units adapted to be loosely disposed within a corn crib or the like and adpated to be covered or partially covered with the corn or grain with which said crib is filled, said units functioning in the manner previously described.

These and other objects and advantages of the invention will be apparent from the following description made in connection with the accompanying drawings wherein like reference characters refer to similar parts throughout the several views and in which, Fig. 1 is a vertical section through a corn crib of common structure having an embodiment of my invention disposed therein;

Fig. 2 is a side elevation of one of my ventilating units;

Fig. 3 is a cross section taken on the line 3—3 of Fig. 2;

Fig. 4 is a section taken on the line 4—4 of Fig. 2; and

Fig. 5 is a cross section taken through the slat structure laid out on a flat surface before my device is assembled.

In Fig. 1 a corn crib C of common structure is shown having the usual slatted walls.

In a general way my invention comprises ventilating units of hollow slatting construction co-operating with the corn or other material disposed in a crib or bin to form air passages through the interior of the material and said slatted units being adequately reinforced to resist fracture from the weight or pressure of the material. Two or more units are usually utilized in a crib, one being disposed in upright position as shown in Fig. 1 and the other disposed substantially horizontally with its end positioned adjacent the lower end of said first mentioned unit. The corn or material surrounding the units defines passages but permits circulation of air laterally through the spaces between the slats thereby causing efficient aeration to the interior of the crib.

It will be obvious that the construction of the slatted units may be varied considerably to obtain the same general structure. I prefer to form each unit from slatted material similar to fencing wherein a plurality of parallel spaced slats 6 are connected and held in proper spaced relation by a series of wire pairs 7, each pair of wires surrounding the slats and being twisted between the same. This fencing structure is made up in suitable lengths to surround a plurality of spaced reinforcing hoops 8 and the wire pairs may be secured together about hoops 8 by twisting or otherwise connecting the opposite ends as shown at 9 in Fig. 3. Hoops 8 may be of band construction or heavy wire construction as desired and I prefer to provide said hoops with out-turned binding edges $8^a$ adapted to engage the under sides of the slats 6. If the hoops 8 are of band construcion I prefer to provide them with either one or more corrugations $8^b$ for strengthening purposes. Suitable clamping collars 10 surround the slats and the hoops 8, securely clamping the slat structure thereto. As shown, clamping collars 10 comprise bands provided with central corrugations $10^a$ for strengthening purposes and terminating in upturned ends $10^b$ having transverse apertures therethrough adapted to receive a nutted bolt 11 which may be drawn up to securely clamp the slats between the collars and hoops 8. I prefer to provide clamping collars 10 with inturned edges 10° adapted to engage the upper surfaces of the slats to more efficiently prevent displacement of the same.

In operation, my units are loosely disposed within the usual crib or bin, while the material is being placed therein. Usually one of the shorter units is disposed horizontally on or adjacent the floor of the crib and with one end thereof abutting one of the slatted sides of the crib in communication with the air without. Another of said units is usually disposed upright in the crib with its lower end abutting or in close relation to the inner end of said first mentioned unit and the corn or other material is distributed over said horizontal unit and about said upright unit leaving said upright unit disposed centrally of the contents of the crib. The spaces between the slats are covered sufficiently by the corn or other material to cause a draft of air through said units although permitting free lateral distribution of air at all points in the length thereof.

My units are so constructed and reinforced that they will withstand the weight or pressure of the corn or other material without danger of fracture or displacement. The structure is strengthened by the pairs of wire bands connecting and spacing the slats and is reinforced and supported by means of the hoops 8 and clamping collars 10.

From the foregoing description it will be seen that I have provided extremely simple but highly efficient ventilator structure for corn cribs and the like adapted to be manufactured at low cost and capable of being loosely installed in cribs or bins now in use without any expense on the part of the farmer. The units may be disposed and arranged as desired to secure ventilation where needed. It will be obvious that the interior of the material within the crib will be adequately aerated where my device is used. In some cases the longer units may be disposed obliquely to the bottom of the crib with their lower ends in juxtaposition with the slatted crib walls. In such application a single unit will sometimes suffice to give the ventilation required in a small crib.

It will, of course, be understood that various changes may be made in the form, details, arrangement and proportions of the parts without departing from the scope of applicant's invention.

What is claimed is:

1. In a ventilating device for corn cribs and the like, a plurality of spaced annular members having a common axis, a series of circumferentially spaced slats traversing said annular members, means for securing said slats together in spaced relation and a plurality of clamping collars surrounding said slats and co-operating with said annular members to form a substantially rigid tubular unit for the purposes described.

2. The structure set forth in claim 1 and said clamping collars having inturned edges adapted to bind against said slats.

3. In a ventilating device for corn cribs and the like, a tubular unit adapted to be loosely disposed within a corn crib comprising a series of circumferentially arranged spaced slats, flexible members binding said slats together and maintaining the same in spaced relation, a plurality of spaced reinforcing rings within said tubular unit and a plurality of clamping collars surrounding said slats and cooperating with said reinforcing rings.

4. In a ventilating device for corn cribs and the like, a tubular unit adapted to be loosely disposed within a crib, comprising a series of circumferentially arranged spaced slats, a plurality of spaced reinforcing rings within said tubular unit and a plurality of clamping collars surrounding said slats and cooperating with said reinforcing rings to form said tubular unit.

In testimony whereof I affix my signature.

JOHN M. WHITCOMB.